United States Patent [19]

Izawa et al.

[11] Patent Number: 5,719,657
[45] Date of Patent: Feb. 17, 1998

[54] PROGRESSIVE POWER LENS

[75] Inventors: Yasunori Izawa; Moriyasu Shirayanagi, both of Tokyo, Japan

[73] Assignee: Asahi Kogaku Kogyo Kabushiki Kaisha, Tokyo, Japan

[21] Appl. No.: 816,888

[22] Filed: Mar. 13, 1997

Related U.S. Application Data

[63] Continuation of Ser. No. 345,396, Nov. 21, 1994, abandoned.

[30] Foreign Application Priority Data

Nov. 19, 1993 [JP] Japan ................................ 5-290930
Sep. 14, 1994 [JP] Japan ................................ 6-219887

[51] Int. Cl.$^6$ .................................................. G02C 7/06
[52] U.S. Cl. .................................................. 351/169
[58] Field of Search .............................. 351/169, 168, 351/170, 171, 172

[56] References Cited

U.S. PATENT DOCUMENTS

| | | | |
|---|---|---|---|
| 4,606,626 | 8/1986 | Shinohara | 351/169 |
| 4,640,593 | 2/1987 | Shinohara | 351/169 |
| 4,950,057 | 8/1990 | Shirayanagi | 351/169 |
| 4,988,182 | 1/1991 | Takahashi et al. | 351/169 |
| 5,210,553 | 5/1993 | Barth et al. | 351/169 |

FOREIGN PATENT DOCUMENTS

| | | |
|---|---|---|
| 1221722 | 9/1989 | Japan . |
| 2-39768 | 9/1990 | Japan . |
| 4500870 | 2/1992 | Japan . |

*Primary Examiner*—David C. Nelms
*Assistant Examiner*—Jordan M. Schwartz
*Attorney, Agent, or Firm*—Greenblum & Bernstein, P.L.C.

[57] ABSTRACT

A progressive power lens whose distance viewing vertex power is a negative value and in which a surface refractive power $Pf_m$ in the main meridional plane in a distance viewing portion is larger than a surface refractive power $Pf_s$ in a plane perpendicular to the main meridional plane ($Pf_m > Pf_s$). A surface refractive power $Pn_m$ in a section in the main meridional plane in a near viewing portion is smaller than the surface refractive power $Pn_s$ in a plane perpendicular to the main meridional plane ($Pn_m < Pn_s$).

7 Claims, 4 Drawing Sheets

PROGRESSIVE POWER LENS

This application is a continuation of application Ser. No. 08/345,396, filed Nov. 21, 1994, now abandoned.

BACKGROUND OF THE INVENTION

1. Field of the Invention

The present invention relates to a progressive power lens for glasses, and more precisely to a progressive power lens in which the distance vertex power is negative.

2. Description of Related Art

In general, a progressive power lens has a distance viewing portion located on the upper half of the lens, a near viewing portion located on the lower half of the lens, and an intermediate viewing area located between the distance portion and the near portion in which the surface refractive power progressively varies from the upper portion toward the lower portion. In such a progressive power lens, the surface refractive power of the distance portion is naturally different from that of the near portion. However, the surface refractive power in the meridional plane at a certain point on a main meridian is identical to the surface refractive power in a plane perpendicular to the main meridional plane at that point, in order to facilitate the production thereof. In recent progressive power lenses, the surface refractive power at a certain point in the plane perpendicular to the main meridional plane can be easily made different from the surface refractive power in the main meridional plane. Consequently, there have been many proposals regarding the surface refractive power.

Furthermore, in general, lenses for glasses including a progressive power lens need to be as thin as possible. For the same diopter of lens, the lens thickness can be reduced using a gentle base curve. However, if such a gentle base curve is used in the progressive power lens, it is difficult to correct aberrations and particularly the astigmatism. To this end, in conventional progressive power lenses, an appropriate base curve is selected taking into account the correction for aberration. Therefore, there is a limit to the reduction of the lens thickness.

SUMMARY OF THE INVENTION

It is an object of the present invention to provide an improved progressive power lens in which both the reduction of the thickness and the correction of aberrations can be achieved in a balanced combination.

The inventors of the present invention have found that if the surface refractive power in the main meridional plane is larger than that in a plane perpendicular to the meridional plane (the sagittal plane) within a distance viewing portion and the surface refractive power in the meridional plane is smaller than that in the sagittal plane within a near viewing portion, the reduction of the thickness and the correction for aberrations can be obtained in a balanced combination particularly in a progressive power lens whose distance vertex power is negative can be achieved more effectively than in conventional progressive power lenses.

To achieve the object mentioned above, according to the present invention, there is provided a progressive multiple focus lens whose distance vertex power is negative, in which a surface refractive power at a point along the main meridian $Pf_m$ in the main meridional plane in the distance portion is larger than the surface refractive power at the same point along the main meridian $Pf_s$ in the saggital plane ($Pf_m > Pf_s$), and a surface refractive power at a point along the main meridian $Pn_m$ in the main meridional plane in a near portion is smaller than the surface refractive power at the same point along the main meridian $Pn_s$ in the saggital plane ($Pn_m < Pn_s$). In the formulae appearing in the the specification, "P" generally designates a surface refractive power, "n" and "f" suffixed to "P" a near portion and a distance portion, and "$_m$" and "$_s$" suffixed to "n" or "f" a meridional plane and a saggital plane, respectively.

Preferably, the value of the surface refractive power Pm is identical to the surface refractive power Ps at a point in the vicinity of a specific point on the main meridional plane at which there is no prismatic power.

The present invention also discloses preferable embodiments of the near vertex power distribution of a progressive multiple focus lens.

According to the first aspect of the present invention, the near vertex power $S_N$ (D: diopter) is a negative value ($S_N < 0$), and there is the following relationship is satisfied at a point within the near portion:

$$Pn_m(-20) - Pn_s(-20) < -0.1;$$

wherein $Pn_m(-20)$ represents a sectional surface refractive power at a point, on the main meridian, downward 20 mm from a prism reference point of said progressive power lens in said near portion; and, $Pn_s (-20)$ represents a sectional surface refractive power at a point, in a direction perpendicular to said main meridian, downward 20 mm from a prism reference point of said progressive power lens in said near portion.

With this relationship, a good field of view can be obtained throughout the entire near portion.

According to a second aspect, the near vertex power $S_N$ (D) is equal to or greater than zero ($S_N \geq 0$), and the following relationship is satisfied at a point within the near portion;

$$Pn_m(-20) - Pn_s(-20) < -0.2.$$

For $S_N \geq 0$, if $Pn_m - Pn_s < 0$, an astigmatism correction effect can be obtained. To obtain a more effective correction of astigmatism, it is preferable that the value of ($Pn_m - Pn_s$) is smaller than −0.2.

Moreover, the present invention also discloses preferable aspects of distance vertex power distribution for a progressive multiple focus lens.

According to one aspect, the distance vertex power $S_F$(D) is;

$$-2 \leq S_F \leq 0$$

and, wherein the following relationship is satisfied at a point within the distance portion;

$$Pf_m(15) - Pf_s(15) > 0.1,$$

wherein $Pf_m(15)$: sectional surface refractive power at a point, on the main meridian, upward 15 mm from a prism reference point of said progressive power lens in said distance portion, and, $Pf_s(15)$: sectional surface refractive power at a point, in a direction perpendicular to said main meridian, upward 15 mm from a prism reference point of said progressive power lens in said distance portion.

In particular, the value of $S_F$ is preferably;

$$-2 \leq S_F \leq -1.$$

If the value of $S_F$ is negative, and preferably;

$Pf_m(15)-Pf_s(15)>0$ a good astigmatism correction effect can be obtained. The amount of aberration to be corrected must be increased as the value of $S_F$ decreases. For example if $-2 \leq S_F \leq 0$, a difference of less than 0.1 ($Pf_m-Pf_s$) is insufficient to correct the aberration. If $-1 < S_F \leq 0$, the aberration is so low that no correction is necessary.

According to another aspect, the distance vertex power $S_F(D)$ is;

$-6 < S_F < -2$ and wherein the following relationship is satisfied at a point within the distance portion;

$Pf_m(15)-Pf_s(15)>0.2$ .

In the case where;

$-6 < S_F < -2$, if the value of $[Pf_m(15)-Pf_s(15)]$ is not larger than 0.2, insufficient astigmatism correction occurs.

Moreover, the inventors have found that in a progressive power lens whose distance vertex power is negative, if the difference (Pm−Ps>0) in the surface refractive power between the main meridional plane and the sagittal plane in the distance portion and the difference in the surface refractive power between the main meridional plane and the sagittal plane in the near portion are relatively large, reduction of the lens thickness and the aberration correction can be achieved with a good balance.

According to another aspect of the present invention, there is provided a progressive power lens whose distance vertex power is negative, in which a surface refractive power Pm in the main meridional plane, and a surface refractive power Ps in the saggital plane satisfy the following relationship;

$\Delta P(15)-\Delta P(-20)>0.3$, wherein $\Delta P = P_m - P_s$, and wherein

ΔP(15): difference between sectional surface refractive powers Pm and Ps at a point upward 15 mm from a prism reference point of said progressive power lens, and, ΔP(−20): difference between sectional surface refractive powers Pm and Ps at a point downward 20 mm from a prism reference point of said progressive power lens.

If the value of ΔP(15)−ΔP(−20) is not larger than 0.3, the aberration cannot be effectively corrected in the distance portion or in the near portion.

The present invention can be advantageously applied particularly to a progressive multiple focus lens whose addition power(ADD) is 0.5 to 4. In the case of a lens having an addition power that is less than 0.5, there is no or little aberration.

If the addition power is above 4, not only there is a large difference in diopter between the distance portion and the near portion, but the amount of aberration to be corrected increases, and hence there is a problem with the manufacture of such a lens. Ideally, ADD≦3. Also, preferably, $S_N < -1$, since there is little aberration at $S_N = 0$ in the near portion, so that no remarkable aberration correction is not expected.

In conclusion, the largest aberration correction effect exists when $0.5 \leq ADD \leq 3.0$ and $S_N < -1$.

BRIEF DESCRIPTION OF THE DRAWINGS

The invention will be described below in detail with reference to the accompanying drawings, in which.

DESCRIPTION OF THE PREFERRED EMBODIMENT

Figure 1:
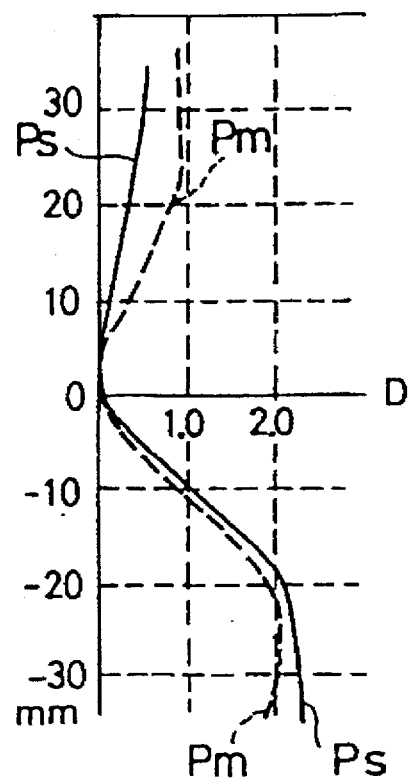
FIG. 1 is a diagram of the surface refractive power distributions at points along the main meridian for the main meridional and sagittal planes, in a progressive power lens according to a first embodiment of the present invention.
Figure 2:
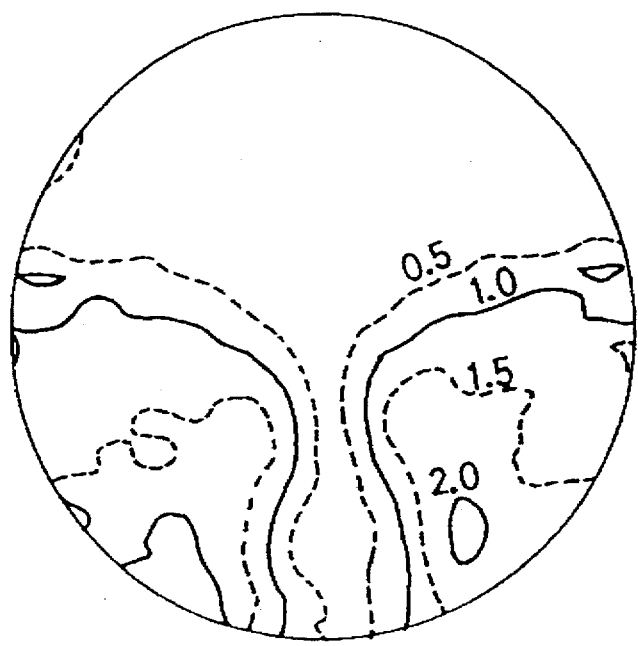
FIG. 2 is a diagram of an astigmatism distribution in a lens shown in FIG. 1.
Figure 3:
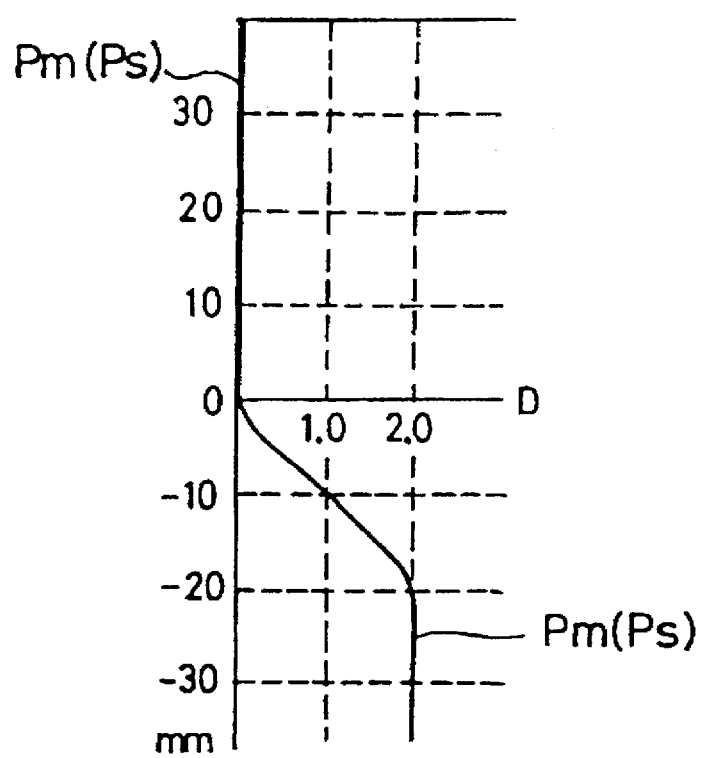
FIG. 3 is a diagram of the surface refractive power distribution at points along the main meridian where the surface refractive power for the main meridional plane is equal to that of the sagittal plane for a given point, in comparison the first embodiment shown in FIG. 1.
Figure 4:
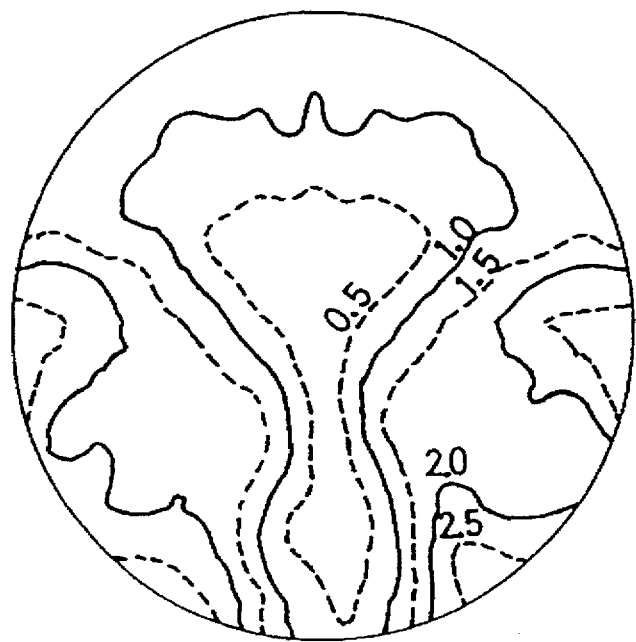
FIG. 4 is a diagram of an astigmatism distribution in a lens shown in FIG. 3.

FIGS. 1 and 2 show a first embodiment of the present invention. FIGS. 3 and 4 show a comparative example for the first embodiment. The first embodiment is applied to a progressive power lens for glasses, in which the distance vertex power $(S_F)$SPH=−4.0; the addition power $(S_N-S_F)$ ADD=2.0, the base curve $D_1$=2.0; i.e., the diopter in the distance viewing portion is −4D and the diopter in the near viewing portion is −2D, respectively.

FIG. 1 shows diopter distributions in the sagittal plane and the main meridional plane at points along the main meridian. As can be seen in FIG. 1, the surface refractive power (phantom line) Pm in the main meridional plane is larger than the surface refractive power (solid line) Ps in the sagittal plane, in the distance viewing portion (positive (+) area in the ordinate direction). On the other hand, the surface refractive power (solid line) in the sagittal plane is larger than the surface refractive power (phantom line) in the main meridional plane, in the near portion (negative (−) area in the ordinate direction). The curve Pm representing the surface refractive power distribution in the sagittal plane intersects the curve Ps representing the surface refractive power distribution in the meridional plane, only at one point near the specific point at which there is no prismatic power, i.e., light passes through without being refracted. Namely, the value of the surface refractive power Pm is identical to the value of the surface refractive power Ps at the intersecting point.

As can be understood from the above discussion, one of the most significant features of the present invention resides in the special relationship between the values of Pm and Ps in which Pm is larger than Ps in the distance viewing portion but is smaller than Ps in the near viewing portion. Another feature of the present invention is the values of Pm and Ps at one point near the specific point at which there is no prismatic power are the same.

Note that in FIGS. 1 and 3, the surface refractive power at the intersecting point (at which Pm is identical to Ps) in the intermediate portion is a reference value (=0), and the actual surface refractive power in the distance viewing portion is negative.

FIG. 2 shows an astigmatism of a progressive power lens in which the surface refractive power is set as shown in FIG. 1.

FIG. 3 shows a comparative example of a surface refractive power distribution in which the surface refractive power in the main meridional plane is identical to the surface refractive power in the sagittal plane for all points along the main meridian. The specification of the lens is the same as that in FIG. 1. The astigmatism of the lens shown in FIG. 3 is shown in FIG. 4.

In FIGS. 2 and 4, the astigmatism shown in each figure is indicated at an interval of 0.5D. As can be seen in FIGS. 2 and 4, the astigmatism is effectively corrected in the present invention, in comparison with the comparative example shown in FIG. 4 in which the surface refractive powers in the main meridional plane and the sagittal plane are identical.

Figure 5:
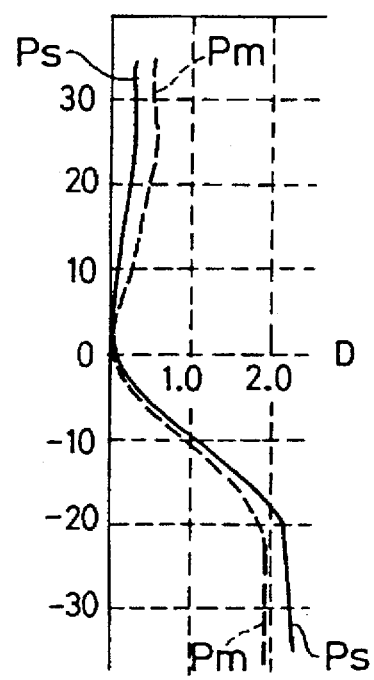
FIG. 5 is a diagram of the surface refractive power distributions at points along the main meridian for the main meridional and sagittal planes, in a progressive power lens according to a second embodiment of the present invention.
Figure 6:
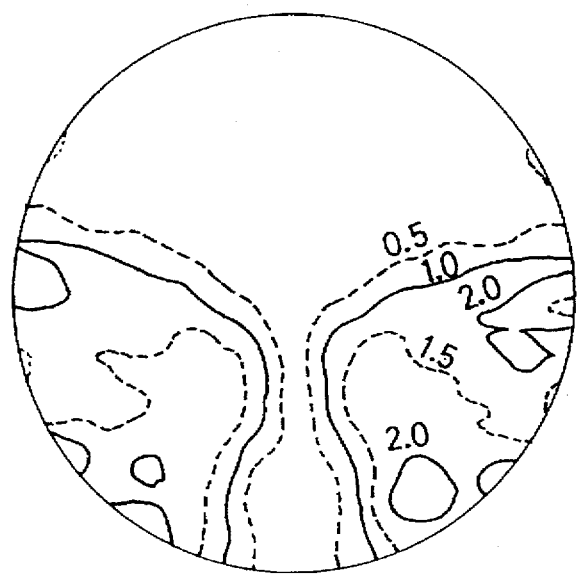
FIG. 6 is a diagram of an astigmatism distribution in a lens shown in FIG. 5.
Figure 7:
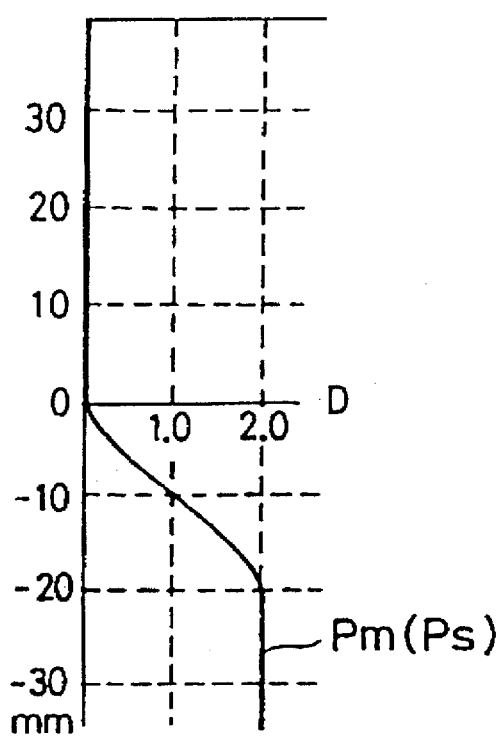
FIG. 7 is a diagram of a the surface refractive power distribution at points along the main meridian where the surface refractive power for the main meridional plane is equal to that of the sagittal plane for a given point, in comparison with the second embodiment shown in FIG. 5; and, FIG. 8 is a diagram of an astigmatism distribution in a lens shown in FIG. 7.
Figure 8:
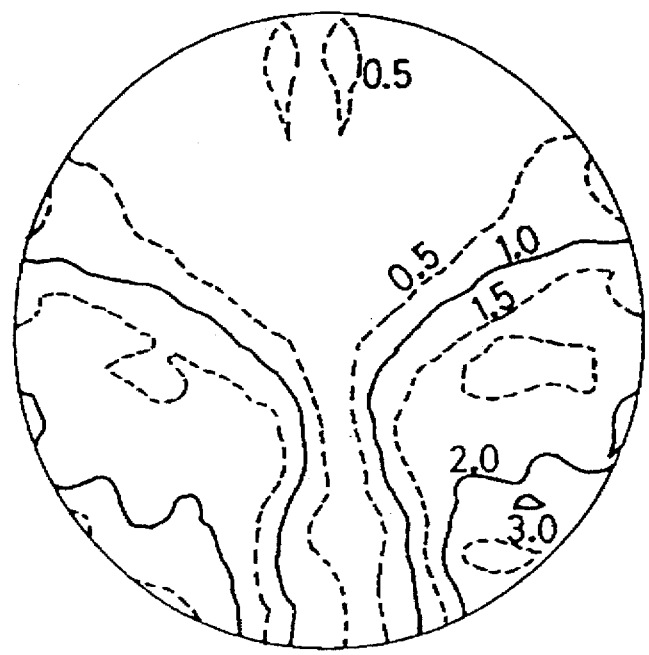

FIGS. 5 and 6 show a second embodiment of the present invention. FIGS. 7 and 8 show a comparative example. The second embodiment is applied to a progressive power lens for glasses, in which the distance vertex power $(S_F)$SPH=−2.0; the addition power $(S_N-S_F)$ADD=2.0, the base curve $D_1$=4.0; i.e., the diopter in the distance viewing portion is −2D and the diopter in the near viewing portion is 0D, respectively.

FIG. 5 shows diopter distributions in the sagittal plane and the main meridional plane at points along the meridian. As can be seen in FIG. 5, similar to the first embodiment mentioned above, the surface refractive power (phantom line) Pm in the main meridional plane is larger than the surface refractive power (solid line) Ps in the sagittal plane, for the distance viewing portion (positive (+) area in the ordinate direction). On the other hand, the surface refractive power (solid line) in the sagittal plane is larger than the surface refractive power (phantom line) in the main meridional plane, in the near viewing portion (negative (−) area in the ordinate direction). The curve Pm representing the surface refractive power distribution in the sagittal plane intersects the curve Ps representing the surface refractive power distribution in the main meridional plane, only at one point near the specific point at which there is no prismatic power, i.e., light passes through without being refracted. Namely, the value of the surface refractive power Pm is identical to the value of the surface refractive power Ps at the intersecting point.

FIG. 6 shows an astigmatism of a progressive power lens in which the surface refractive power is set as shown in FIG. 5.

FIG. 7 corresponding to FIG. 5 shows a comparative example of a surface refractive power distribution in which the surface refractive power in the main meridional plane is identical to the surface refractive power in the sagittal plane. The specification of the lens in FIG. 7 is the same as that in FIG. 5. The astigmatism of the lens shown in FIG. 7 is shown in FIG. 8.

As can be seen in FIGS. 6 and 8, the astigmatism is effectively corrected in the present invention, in comparison with the comparative example shown in FIG. 8 in which the surface refractive powers in the main meridional plane and the sagittal plane are identical.

Table 1 below shows numerical values of the above-mentioned first and second embodiments. Both the first and second embodiments satisfy the requirements defined by the aforementioned formulae.

TABLE 1

| | $Pn_m(-20) - Pn_s(-20)$ | $Pf_m(15) - Pf_m(15)$ | $\Delta P(15) - \Delta P(-20)$ |
|---|---|---|---|
| first embodiment | −0.18 | 0.35 | 0.53 |
| second embodiment | −0.28 | 0.19 | 0.47 |

As can be understood from the above discussion, according to the present invention, not only can the lens thickness be reduced but also the aberrations can be effectively corrected particularly in a progressive power lens in which the distance portion has a negative power.

We claim:

1. A progressive power lens whose distance vertex power is negative,
    wherein a surface refractive power $Pf_m$ at a point along the main meridian in the main meridional plane in a distance viewing portion of said progressive power lens is larger than a surface refractive power $Pf_s$ at the point along the main meridian in a plane perpendicular to said main meridional plane in a distance viewing portion,
    wherein a surface refractive power $Pn_m$ at a point along the main meridian in said main meridional plane in a near viewing portion of said progressive power lens is smaller than a surface refractive power $Pn_s$ at the point along the main meridian in a plane perpendicular to said main meridional plane in a near viewing portion, and wherein said surface refractive powers $Pf_m$, $Pf_s$, $Pn_m$ and $Pn_s$ are determined in accordance with a shape of a surface of said progressive power lens.

2. A progressive power lens according to claim 1, wherein a value of a surface refractive power Pm in said main meridional plane is identical to a surface refractive power Ps in said plane perpendicular to said main meridional plane at a point proximate to a specific point on the main meridian at which there is no prismatic power.

3. A progressive power lens according to claim 1, wherein a near vertex power $S_N$ is negative, and wherein the following relationship exists at a point within said near portion;

$$Pn_m(-20) - Pn_s(-20) < -0.1$$

wherein $Pn_m(-20)$ represents a sectional surface refractive power at a point, on the main meridian, downward 20 mm from a prism reference point of said progressive power lens in said near portion, and, $Pn_s(-20)$ represents a sectional surface refractive power at a point along the main meridian, in a direction perpendicular to said main meridian, downward 20 mm from a prism reference point of said progressive power lens in said near portion.

4. A progressive power lens according to claim 1, wherein the near vertex power $S_N$ is equal to or more than zero ($S_N \leq 0$), and wherein the following relationship exists at a point within the near portion;

$$Pn_m(-20)-Pn_s(-20)<-0.2$$

wherein $Pn_m(-20)$ represents a sectional surface refractive power at a point, on the main meridian, downward 20 mm from a prism reference point of said progressive power lens in said near portion, and, $Pn_s(-20)$ represents a sectional surface refractive power at a point along the main meredian, in a direction perpendicular to said main meridian, downward 20 mm from a prism reference point of said progressive power lens in said near portion.

5. A progressive power lens according to claim 1, wherein the distance vertex power $S_F(D)$ is;

$$-2 \leq S_F \leq 0,$$

and wherein the following relationship exists at a point within the distance portion;

$$Pf_m(15)-Pf_s(15)>0.1,$$

wherein $Pf_m(15)$ represents a sectional surface refractive power at a point, on the main meridian, upward 15 mm from a prism reference point of said progressive power lens in said distance portion, and, $Pf_s(15)$ represents a sectional surface refractive power at a point along the main meridian, in a direction perpendicular to said main meridian, upward 15 mm from a prism reference point of said progressive power lens in said distance portion.

6. A progressive power lens according to claim 1, wherein the distance vertex power $S_F(D)$ is;

$$-6<S_F<-2,$$

and wherein the following relationship exists at a point within the distance portion;

$$Pf_m(15)-Pf_s(15)>0.2,$$

wherein $Pf_m(15)$ represents a sectional surface refractive power at a point, on the main meridian, upward 15 mm from a prism reference point of said progressive power lens in said distance portion, and, $Pf_s(15)$ represents a sectional surface refractive power at a point along the main meridian, in a direction perpendicular to said main meridian, upward 15 mm from a prism reference point of said progressive power lens in said distance portion.

7. A progressive power lens whose distance vertex power is negative, wherein a surface refractive power $P_m$ in a section of the main meridional plane, and a surface refractive power $P_s$ in a section perpendicular to the main meridional plane satisfy the following relationship:

$$\Delta P(15)-=P(-20)>0.3$$

wherein $$\Delta P=Pm-Ps$$

wherein $\Delta P(15)$ represents a difference between sectional surface refractive powers Pm and Ps at a point upward 15 mm from a prism reference point of said progressive power lens, and, $\Delta P(-20)$ represents a difference between sectional surface refractive powers Pm and Ps at a point downward 20 mm from a prism reference point of said progressive power lens.

* * * * *

UNITED STATES PATENT AND TRADEMARK OFFICE
CERTIFICATE OF CORRECTION

PATENT NO. : 5,719,657
DATED : February 17, 1998
INVENTOR(S) : Y. IZAWA et al.

It is certified that error appears in the above-identified patent and that said Letters Patent is hereby corrected as shown below:

At column 8, line 28, (claim 7, line 8) of the printed patent, change " =P(-20)", to read -- $\Delta$P(-20) --.

Signed and Sealed this

Eleventh Day of April, 2000

Attest:

Attesting Officer

Q. TODD DICKINSON

Director of Patents and Trademarks